(12) United States Patent
Sobiski et al.

(10) Patent No.: US 6,487,352 B1
(45) Date of Patent: Nov. 26, 2002

(54) ELECTRICAL DETECTOR FOR ADAPTIVE CONTROL OF CHROMATIC DISPERSION IN OPTICAL SYSTEMS

(75) Inventors: Donald J. Sobiski, Horseheads; L. Christopher Henning, Corning, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/784,309

(22) Filed: Feb. 16, 2001

Related U.S. Application Data

(63) Continuation-in-part of application No. 09/589,423, filed on Jun. 7, 2000.
(60) Provisional application No. 60/185,158, filed on Feb. 18, 2000.

(51) Int. Cl.[7] .............................. G02B 6/00; H04B 10/18
(52) U.S. Cl. ..................... 385/122; 359/161; 359/337.5
(58) Field of Search ................... 385/11, 122; 359/161, 359/153, 154, 177, 179, 337.5

(56) References Cited

U.S. PATENT DOCUMENTS

| | | |
|---|---|---|
| 5,887,104 A | 3/1999 | Sugizaki et al. |
| 5,995,695 A | 11/1999 | Aikawa et al. |
| 5,999,289 A | 12/1999 | Ihara et al. |
| 6,137,604 A | 10/2000 | Bergano |
| 6,266,170 B1 * | 7/2001 | Fee |
| 6,307,988 B1 * | 10/2001 | Eggleton et al. |
| 6,320,687 B1 * | 11/2001 | Ishikawa |

FOREIGN PATENT DOCUMENTS

| | | |
|---|---|---|
| EP | 0 902 560 A2 | 3/1999 |
| EP | 0 912 001 A2 | 4/1999 |
| EP | 0 971 493 A2 | 1/2000 |
| EP | 0 902 560 A3 | 8/2001 |

* cited by examiner

*Primary Examiner*—Rodney Bovernick
*Assistant Examiner*—Juliana K. Kang
(74) *Attorney, Agent, or Firm*—Volentine Francos, PLLC

(57) ABSTRACT

An optical device for detecting chromatic dispersion is described. The optical device includes a receiver, which converts an optical signal into an electrical signal having a plurality of frequency components. A bandpass section separates the plurality of frequency components and a gain section amplifies each of the plurality of frequency components of the electrical signal. Each of the spectral components has a corresponding voltage level and each voltage level may be compared to known voltage levels of a signal having little or no chromatic dispersion. From this comparison, the amount of chromatic dispersion may be determined. The optical device may be used as an element of a chromatic dispersion compensation device, or as a stand-alone device for measuring the amount of chromatic dispersion in an optical signal. A method of compensating for chromatic dispersion in real-time based on the optical device and dispersion compensator is also described.

15 Claims, 5 Drawing Sheets

ELECTRICAL DETECTOR FOR ADAPTIVE CONTROL OF CHROMATIC DISPERSION IN OPTICAL SYSTEMS

CROSS REFERENCE TO RELATED APPLICATIONS

The present invention is a continuation-in-part of U.S. patent application Ser. No. 09/589,423 entitled "All Fiber Polarization Mode Dispersion Compensator", filed Jun. 7, 2000, and assigned to the assignee of the present invention. The disclosure of this parent application is specifically incorporated by reference herein. The present application also claims priority from U.S. Provisional Application No. 60/185,158 entitled "Electrical Detector For Adaptive Control Of Chromatic Dispersion In Optical Systems", filed Feb. 18, 2000, the disclosure of which is specifically incorporated by reference herein.

FIELD OF THE INVENTION

The present invention relates generally to optical communication systems, and particularly to a method and apparatus for compensating for chromatic dispersion in optical systems.

BACKGROUND OF THE INVENTION

Optical transmission systems, including optical fiber communication systems, have become an attractive vehicle for carrying voice and data at high speeds. In optical transmission systems waveform degradation due to chromatic dispersion in the optical transmission medium can be problematic, particularly as transmission speeds are ever-increasing. Chromatic dispersion results from the fact that in transmission media such a glass optical fibers, the higher the frequency of the optical signal, the greater the refractive index. As such, higher frequency components of optical signals will "slow down," and contrastingly, lower frequency signals will "speed up." Moreover, impurities in the glass mechanical stress and strain, and temperature effects can also affect the index of refraction, further adding to the ill-effects of chromatic dispersion.

In digital optical communication systems, where the optical signal is ideally a square wave, bit spreading due to chromatic dispersion can be particularly problematic. As the "fast frequencies" in the signal slow down and the "slow frequencies" in the signal speed up as a result of dispersion, the shape of the wave can be substantially impacted. Accordingly, the effects of this type of dispersion are a spreading of the original pulse in time, causing it to overflow in the time slot that has been allotted to another bit. When the overflow becomes excessive, inter-symbol interference (ISI) may occur. ISI may result in an increase in bit-error rate to unacceptable levels.

An example of bit spreading due to chromatic dispersion is shown in FIG. 1. The "101" bit sequence shown at 101, 102, 103, respectively, is an ideal signal transmission in this illustrative example. As can be readily understood by one of ordinary skill in the art, in order to achieve sharp rising edges 104 and the sharp trailing edges 105 a large number of relatively high frequency Fourier components is required. As described briefly above, these higher frequency components are "slowed down" through chromatic dispersion, and as can be seen in signal 106, the waveform is significantly altered (spread) due to the dispersion of the higher frequency components. Because the peak power in each pulse is reduced as the total power is spread out, and power is distributed between bits as a result of dispersion, predetermined detection thresholds used to discriminate digital bit "1's" from digital bit "0's" may not be attained. Thus, the chromatic dispersion may create unacceptable bit-error rates as the "1's" have insufficient power to reach a detection threshold, and the "0's" have too much power, and thereby exceed the threshold.

Conventional techniques to curb the ill-effects of chromatic dispersion are primarily static in nature. One conventional static technique includes the use of chromatic dispersion (CD) compensating fiber in which positive or negative dispersion can be selectively introduced into an optical communication system. For example, if positive chromatic dispersion is present, negative compensating optical fiber may be selectively placed in the optical communication system to "reshape" the spread signal.

Another static technique to curb the ill-effects of chromatic dispersion includes the use of dispersion shifted fiber, which is designed exhibit no chromatic dispersion at a particular wavelength. Unfortunately, in a particular optical communication system, there may be approximately 40 channels or more, having channel center wavelengths spaced at approximately 0.8 nm to approximately 1 nm increments. Illustratively, a 40 channel system could have channel center wavelengths in the range of approximately 1530 nm to 1570 nm. At the 1550 nm wavelength channel, there is little or no chromatic dispersion, barring other influences. However, in channels having shorter center channel wavelengths, positive chromatic dispersion is introduced; while in channels having longer channel center wavelengths negative chromatic dispersion is introduced. Accordingly, compensation for chromatic dispersion is not readily realized across the entire 40 channel system using this static CD compensation technique.

While the above described techniques have resulted in some success in compensating for chromatic dispersion, these solutions cannot account for time dependent changes in the optical system. Moreover, these solutions require a prior knowledge of the chromatic dispersion of a system. Therefore, the conventional static solutions are neither capable of handling dynamic changes in the chromatic dispersion of an optical signal nor are these solutions capable of ready adaptation for use in a variety of optical systems.

Accordingly, what is needed is a method and apparatus for compensating chromatic dispersion in optical networks that overcomes the shortcomings of the static chromatic dispersion techniques discussed above.

SUMMARY OF THE INVENTION

According to an exemplary embodiment of the present invention, an optical device for detecting chromatic dispersion in an optical system is disclosed. The optical device includes a receiver, which converts an optical signal into an electrical signal having a plurality of frequency components. A bandpass section separates the plurality of frequency components of the electrical signal. Each of the frequency components has a corresponding voltage level. The optical device also includes a gain section which amplifies each of the corresponding voltage levels of the plurality of frequency components, wherein the device outputs a measure of chromatic dispersion in the optical signal based on a comparison of a power level of each of the frequency components to that of an ideal optical signal with no chromatic dispersion.

According to another exemplary embodiment, an apparatus for compensating for chromatic dispersion in an optical signal is disclosed. The apparatus includes a detector, which converts at least a portion of the optical signal into an electrical signal having a plurality of frequency components; a controller, which receives an output from the detector, wherein the detector outputs a measure of the chromatic dispersion present in the optical signal based on a comparison of a power level of each of said frequency components to that of an ideal optical signal with no chromatic dispersion; and a dispersion compensator, which introduces corrective chromatic dispersion based on input from the controller.

According to yet another exemplary embodiment of the present invention, a method for compensating for chromatic dispersion is disclosed. The illustrative method includes converting a portion of an optical signal into an electrical signal having a plurality of frequency components; comparing each of the frequency components of the electrical signal with those of an ideal optical signal having no chromatic dispersion; and introducing corrective chromatic dispersion into the optical signal based on the comparing, so that chromatic dispersion is substantially zero in the official signal.

BRIEF DESCRIPTION OF THE DRAWINGS

The invention is best understood from the following detailed description when read with the accompanying drawing figures. It is emphasized that the various features are not necessarily drawn to scale. In fact, the dimensions of the various features may be arbitrarily increased or decreased for clarity of discussion.

DETAILED DESCRIPTION

In the following detailed description, for purposes of explanation and not limitation, exemplary embodiments disclosing specific details are set forth in order to provide a thorough understanding of the present invention. However, it will be apparent to one of ordinary skill in the art that the present invention may be practiced in other embodiments that depart from these specific details. In other instances, detailed descriptions of well-known devices and methods are omitted so as to not obscure the description of the present invention.

Figure 2:
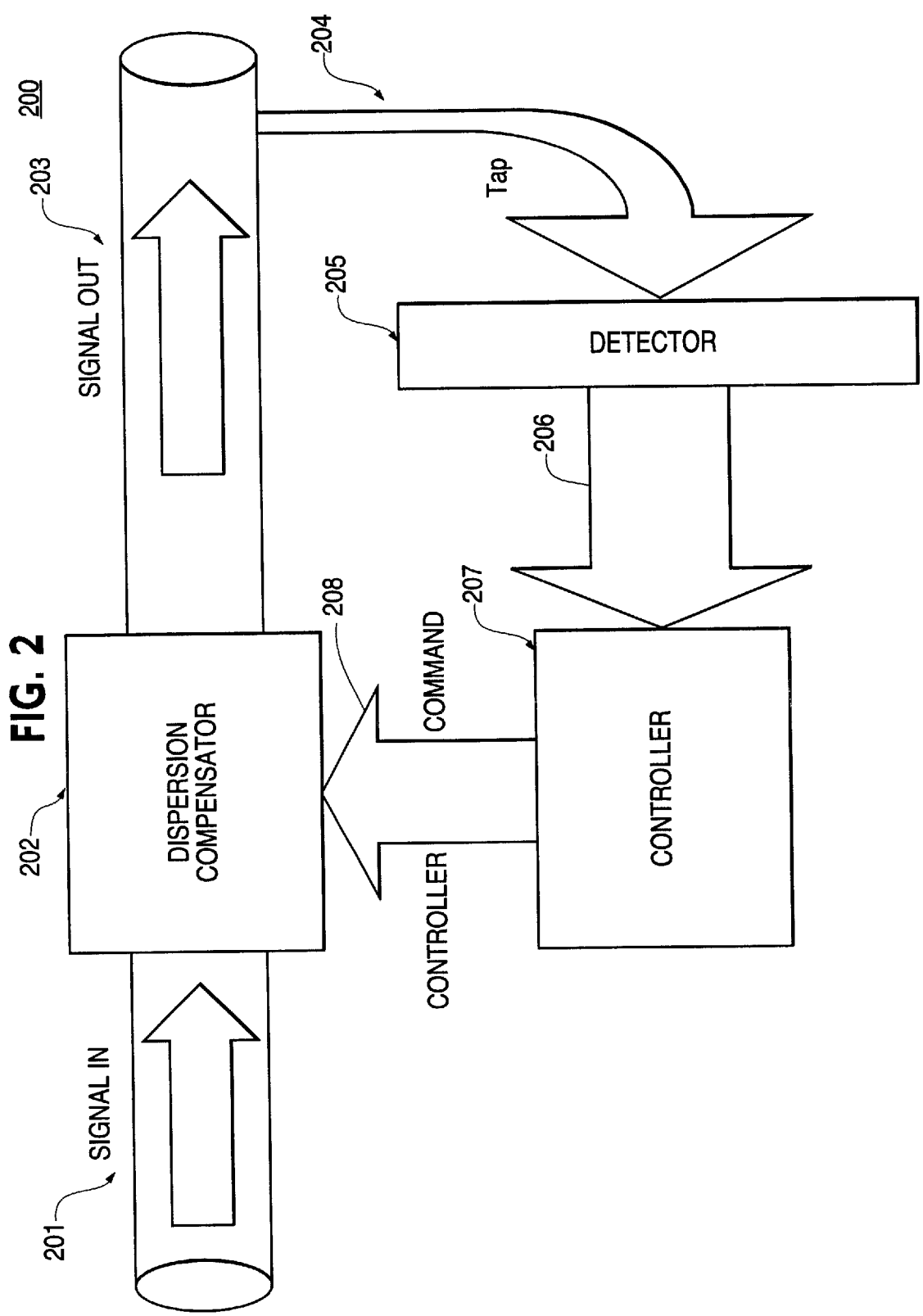
FIG. 2 is a schematic view of a real-time detection and feedback control system incorporating a chromatic dispersion compensator according to an exemplary embodiment of the present invention.

Turning initially to FIG. 2, a real-time detection and feedback control system 200 is first described. According to an illustrative embodiment of the present invention, the real-time detection and feedback control system 200 dynamically compensates for chromatic dispersion in an optical signal. A signal in 201 is input to a dispersion compensator 202 and a signal out 203 continues through the remainder of the optical system (not shown). For purposes of discussion, the optical system may be an optical fiber communication system, such as community antenna television (CATV). Of course, optical fiber communication systems are merely illustrative, and the present invention may be incorporated into other optical transmission systems incorporating other optical transmission media, such as planar optical waveguides.

A portion (or sample) of the signal out 203 is branched-off via a conventional optical tap 204 and input to a detector 205. The detector 205 converts the branched off portion of the optical signal into an electrical signal, which is processed by an exemplary technique discussed in detail below. Electrical signal 206 is output from detector 205 and is input to a controller 207. The controller 207 may include at least one analog-to-digital-converter converter (A/D converter) and microprocessor, for example a digital signal processor (DSP).

As will be described in further detail herein, the output signal 206 of the detector 205 may have missing frequency components as a result of chromatic dispersion. In particular, these frequency components may have been reduced in amplitude or lost completely due to chromatic dispersion. The controller 207 determines which frequency components are reduced in magnitude or missing from the optical signal, and reintroduces these frequency components via the controller command 208 into the dispersion compensator 202. As such, the detector 205 detects the degree of chromatic dispersion in the electrical domain, and the controller 207 compensates for this degree of dispersion by "reintroducing" the Fourier frequency components (again in the electrical domain), which have been lost or which have reduced amplitude due to chromatic dispersion. The dispersion compensator 202 then re-introduces the missing or reduced components (in the optical domain) into the signal out 203 based on the input from the controller 207, and thereby corrects for chromatic dispersion.

In the exemplary embodiment shown in FIG. 2, some of the corrections for chromatic dispersion may be effected by static compensation techniques, such as through the use of dispersion compensating modules (not shown), which may incorporate dispersion compensating fiber such as dispersion shifted fiber. The dispersion compensator 202 of the present invention makes corrections for time varying chromatic dispersion, which may result from temperature fluctuations through normal use of an optical network. The real-time detection and feedback control system 200 of the illustrative embodiment of FIG. 2 dynamically compensates for chromatic dispersion resulting from certain CD creating sources. For example, temperature fluctuations in the optical transmission system can result in CD. Finally, the dispersion compensator 202 of the illustrative embodiment of FIG. 2 may be a chirped fiber Bragg grating (FBG), which compensates by introducing positive or negative chromatic dispersion in small increments to the signal in 201, resulting in a substantially reduced amount of chromatic dispersion in the signal out 203. The magnitude of the incremental introduction of positive or negative chromatic dispersion is typically system dependent as would be readily understood by one having ordinary skill in the art.

Figure 3:
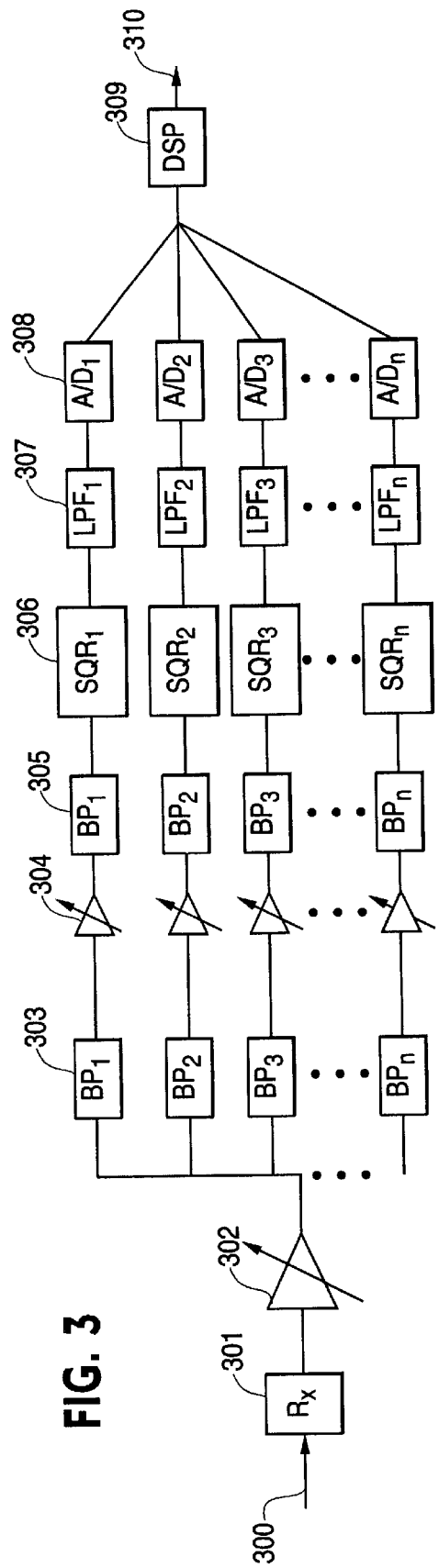
FIG. 3 is a schematic diagram of an electrical detector according to an exemplary embodiment of the present invention.

Referring now to FIG. 3, a schematic (block) diagram of an electrical detector according to an exemplary embodiment of the present invention is shown. It is of interest to note that the detector of FIG. 3 may be used as the measuring device of a feedback control loop. For example, the electrical detector shown in FIG. 3 may be used as the detector 205 of the real-time detection and feedback control system 200 of FIG. 2. However, it is also possible that the detector of the illustrative embodiment shown in FIG. 3 may also be used as a stand alone device to provide a continuous measure of the amount of chromatic dispersion in an optical signal. For example, the detector 205 may be used as a stand alone device for making measurements of the characteristic CD of fiber at manufacture. These data can be then provided to the purchaser of the fiber for reference.

In the illustrative embodiment of FIG. 3, the incoming optical signal 300 is received at a receiver device 301 and converted to an electrical signal. The receiver device 301 is a conventional optoelectronic detector (such as a PIN detector), and illustratively is an amplitude detector. The electrical output of the detector 301 is input to a variable gain amplifier (VGA) 302 in a closed loop configuration. The VGA 302 is placed at the input prior to signal splitting to ensure that a constant composite signal level to the bandpass filter elements 303 is achieved. A control voltage, $V_{control}$ is used to maintain a substantially constant signal output level from the VGA 302 in spite of the variations that may occur in the received signal. This is accomplished by monitoring the amplitude of the lowest frequency bandpass filter BP1 of filter elements 303, which is used specifically as a monitoring channel for the optical signal level. This detected channel output from bandpass filter BP1 is sent to the controller board (not shown) and compared with a reference voltage. As the voltage level of the incoming optical signal 300 varies in amplitude, the output channel from BP1 varies accordingly. Because BP1 has the lowest frequency bandpass filter, its output signal level is not affected appreciably by chromatic dispersion or polarization mode dispersion. The controller board monitors this channel output, and compares it to a reference voltage that is set during initial calibration. When a difference is detected due to optical signal level variations, the controller board sends out a control voltage that is proportional to this difference and will adjust the gain of the VGA until the difference between BP1 channel output and this controller board reference voltage is substantially zero. Thereby, the gain control closed loop function keeps the detector and controller boards from producing erroneous CD calculations due to optical signal level variations. After amplification by the VGA 302, the signal is fed into bandpass filters 303 and divided spectrally. Particularly, the plurality of frequency components of signal in 300 is separated. To this end, as can be readily appreciated by one of ordinary skill in the art, the electrical signal from the receiver 301 is illustratively in the microwave frequency domain. As such, it has spectral or frequency components which span approximately very low frequency (DC) to approximately $10 \times 10^9$ Hz (10 GHz). The bandpass filters are chosen to each pass a portion of the spectrum of the electrical signal from receiver 301. For example, the filter designated $BP_1$, may pass the lower end frequency components, on the order of kHz, while the bandpass Filter $BP_n$, may be designed to pass the high end frequencies, for example on the order of tens of GHz. In the illustrative embodiment shown in FIG. 3, the bandpass filters 303 are narrowband bandpass filters, having passbands that are spaced in frequency such that at least three of the center frequencies of the filters are within the 3 dB bandwidth of the incoming signal.

Amplifiers 304 may then increase the amplitude of t he output of the bandpass filters 303. The amplifiers 304 (or amplifier gain blocks) are useful to amplify the signal, as the power of each portion of the spectrum, having passed through the individual bandpass filters, is relatively small. In the illustrative embodiment, the amplifiers 304 have a gain of approximately 50 dB, and are gene rally broadband amplifiers. As such, the amplifiers 304 may be identical for each of the bandpass filters 303. Because the amplifiers 304 are broadband, it is useful to include another filter stage with the bandpass filters 305 $BP_1$, $BP_2$, . . . , $BP_n$ to ensure spectral quality, and to eliminate spurious signals generated by the amplification process. These bandpass filters 305 are identical to bandpass filters 303. The amplifiers 304 are multistage broadband amplifiers, and are used to set the signal level such that it is high enough to be useful for the circuitry that follows the amplifier and filter sections 304, 305, respectively. Finally, for purposes of illustration, four band pass filters (i.e. n =4) may be used for bandpass filters 303, 305 each having a bandwidth of 10% and having a total bandpass of approximately DC to approximately 10 GHz.

The output of bandpass filters 305 is fed into respective square-law detectors 306, which have a transfer function characterized by $V_{out}=V^2_{in}$. Illustratively, square-law detectors 306 are GaAs based Schottky barrier detectors. As such, the output voltage ($V_{out}$) of each of the square-law detectors 306 is equal to the square of the input voltage ($V_{in}$). The detector output voltage is thereby directly proportional to the input power from each of the proceeding bandpass filters. As will be described more fully herein, the square-law detectors 306 play a useful role in identifying the spectral or frequency components of the optical signal which have been reduced in magnitude or nullified due to chromatic dispersion. The lowpass filters 307 are active lowpass filters with gain that is designed to "smooth" the output of the square-law detectors. Thereby, these lowpass filters 307 ultimately remove fluctuations and variations in output voltage from the square-law detectors 306.

The voltage level of the output of the lowpass filters 307 shifts the DC output to a usable level for input to the A/D converters 308, and ultimately for use in the digital signal processor 309. The A/D converters 308 input the signal from the respective lowpass filters 307 into the digital signal processor 309. The digital signal processor 309 outputs a signal 310 which may then be used to supply correction voltages (also referred to as error voltages) to a chromatic dispersion compensator (e.g. dispersion compensator 202), in an exemplary embodiment in which the detector of FIG. 3 is used in a real-time detection and feedback control loop. Alternatively, the detector of FIG. 3. may be used as a stand alone device as described above.

As will be appreciated through the discussion herein, the A/D converters 308 sample and convert the input analog voltages from lowpass filters 307 to a binary word that will be processed for further use, for example by the digital signal processor 309. The DSP 309 or equivalent microprocessor processes the input signal from the A/D converters and reconstructs a measure of the amount of chromatic dispersion that is present in the received signal. This measurement is suitable for processing in a dynamic feedback control algorithm, for example, to provide for compensation of the chromatic dispersion. One example of such a dynamic feedback control algorithm is as described in U.S. patent application Ser. No. 09/784,329 entitled "Adaptive Feedback Control Method for PMD or CD Compensation" filed on even date herewith. The disclosure of this application is specifically incorporated by reference as though reproduced in its entirety herein.

The detector device of the illustrative embodiment of FIG. 3 operates on the principle that the time domain properties and the frequency domain properties of a signal may be related by Parseval's Law. Parseval's Law states that the power in the signal over time is equal to the power in the signal over frequency. For example, given a time dependent signal v(t):

$$\text{Power} = \frac{1}{T_o} \int_0^{T_o} |v^2(t)| dt = \sum_{n=-\infty}^{\infty} |c_n^2| \quad (1)$$

where $c_n$, are the coefficients of the Fourier expansion for v(t):

$$c_n = \frac{1}{T_o} \int_0^{T_o} v(t) e^{-j\alpha x} dt; \quad n = 1, 2, 3 \quad (2)$$

From an understanding of Parseval's Law above, it is clear that for each power component of a particular signal, there is a Fourier coefficient given by Equation 2. Accordingly, if one or more of the Fourier coefficients of Equation 2 is reduced in magnitude or is zero (due to CD in this example), the corresponding spectral component in the frequency domain will also be reduced in magnitude or eliminated altogether. As such, this component of the signal is accordingly missing. This property permits the determination of a time domain effect to made from frequency domain measurements.

Figure 1:
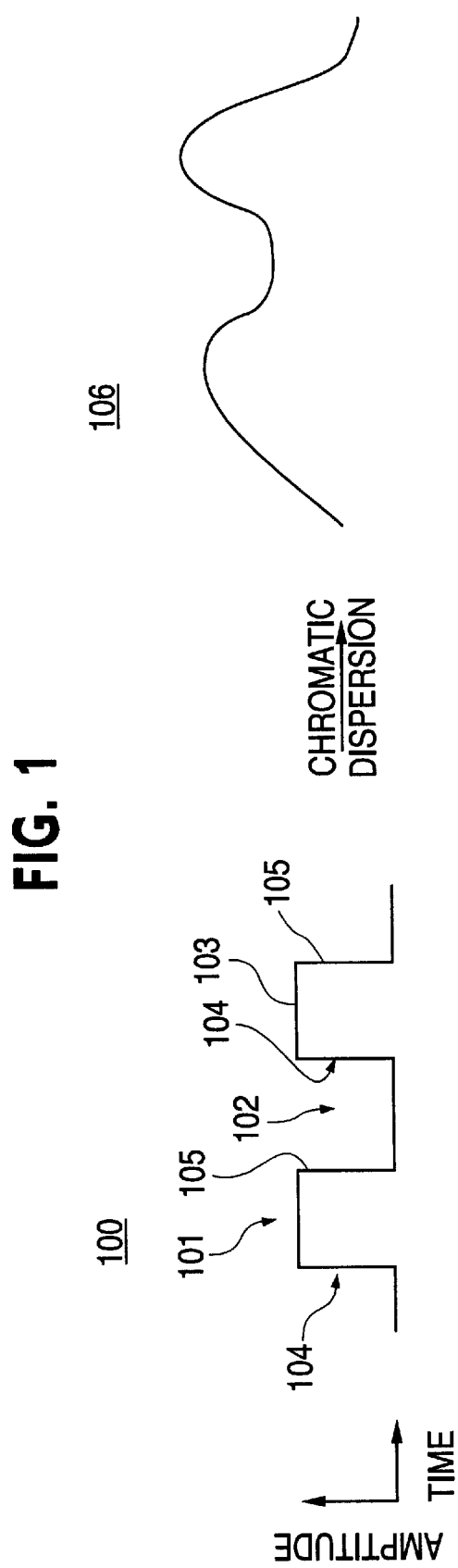
FIG. 1 is a graphical representation showing the affects of chromatic dispersion on a binary optical signal.
Figure 4:
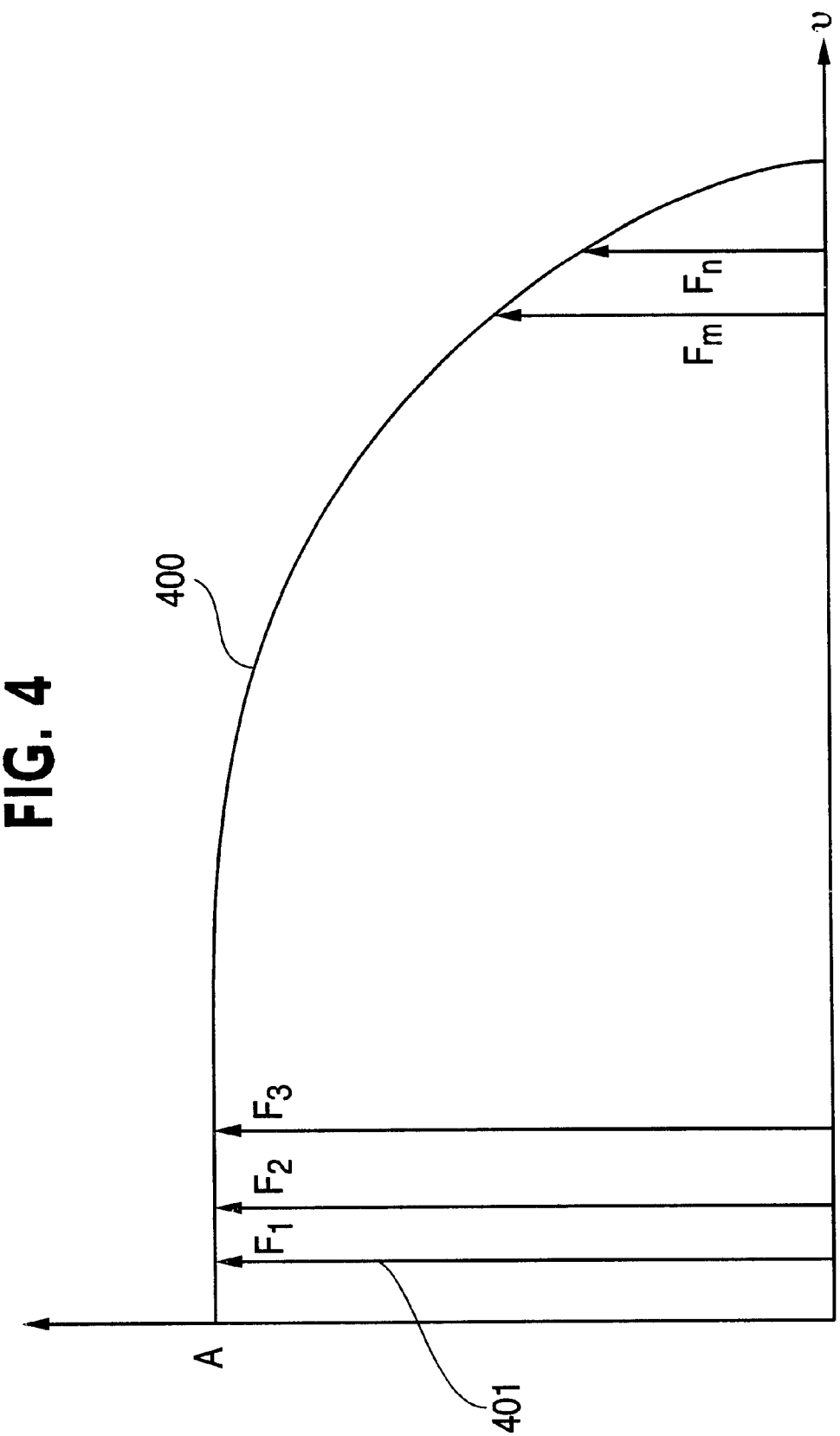
FIG. 4 is a graphical representation of the power spectrum of a binary signal according to an exemplary embodiment of the present invention.

Turning to FIG. 4, an ideal optical signal consisting of no-return to zero pulses, having been converted to the electrical domain and processed up through the lowpass filters 307 of FIG. 3, will have amplitude envelope of 400 and frequency components 401, which are designated $f_1, f_2, f_3, \ldots f_n$. Of course, in the time domain, this is a binary optical signal, such as that shown at 101, 102 and 103 in FIG. 1. The time domain properties are manifest in the spreading of the optical pulse due to chromatic dispersion. From Parseval's Law, it follows that in the frequency domain, the spreading of the pulse in the time domain is manifest in a reduction in magnitude or elimination of one or more of the spectral components 401. From an understanding of Fourier series, this is ultimately manifest in a reduction in magnitude or elimination of the corresponding Fourier coefficients $c_n$, of Equation 2. The reduction or elimination of one or more of the spectral components in the frequency power spectrum changes the spectrum in a characteristic manner which is often referred to as "hole burning."

Figure 5:
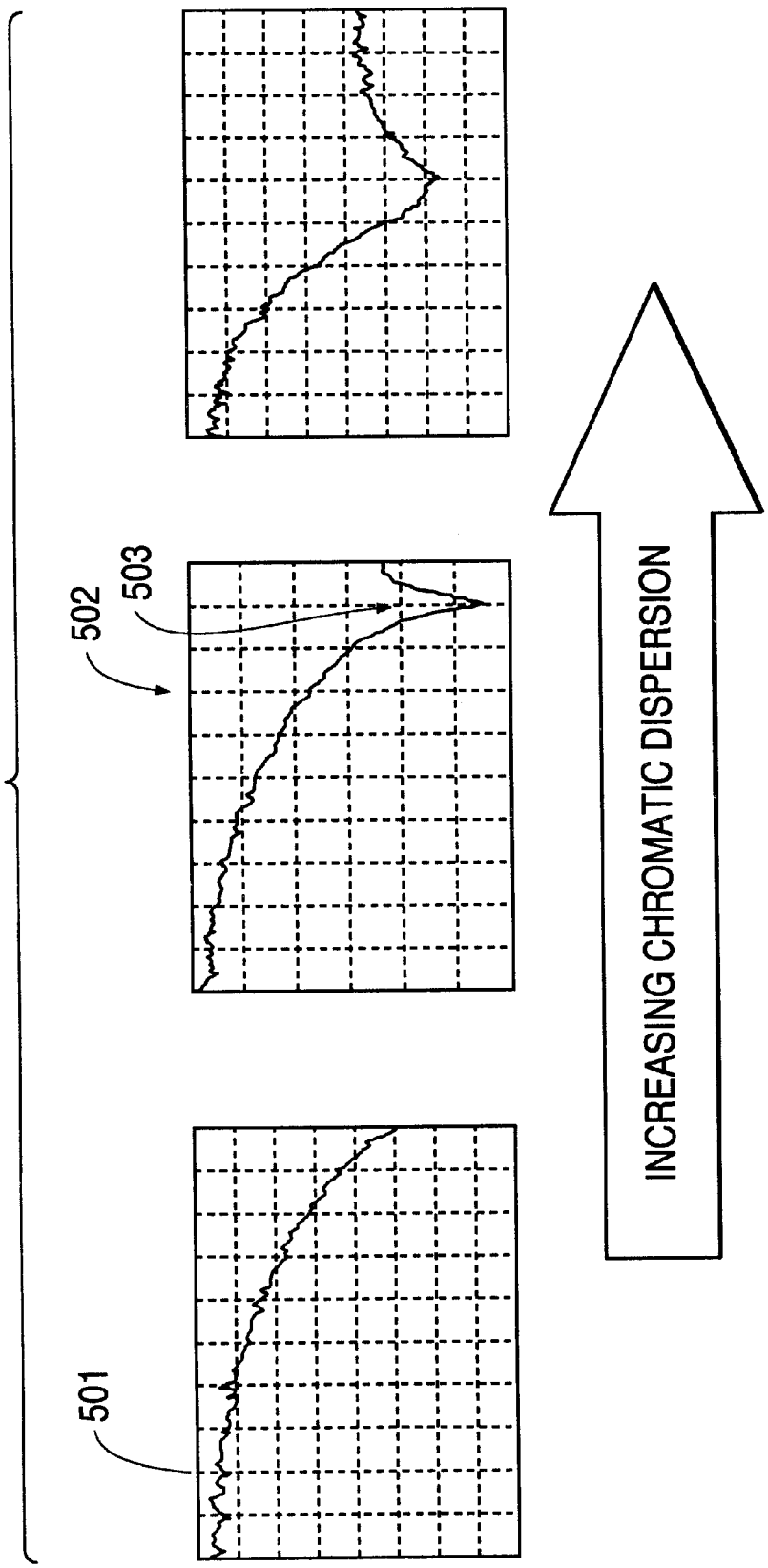
FIG. 5 is a graphical representation showing spectral changes in a signal due to chromatic dispersion in an optical signal.

Turning to FIG. 5, the output of an optical signal in amplitude versus frequency is shown. The graphical representation 501 is typical of a signal, which has experienced no chromatic dispersion. However, the graphical representation 502 shows that "hole burning" has begun to occur at 503. To this end, the amplitude (power) reduction around a specific frequency is directly related to the amount of chromatic dispersion that is contained in the signal at that frequency. A characteristic of the spectral hole is that it enters at the higher end of the frequency spectrum, just before a fundamental component, and traverses monotonically towards lower frequency components as the dispersion increases. This permits determination of the amount of dispersion present in the signal. In the illustratively embodiment, the filters' range collectively span the spectral range of the signal, allowing observation of this movement. As the amount of chromatic dispersion increases in the time domain, the hole "moves" to lower frequencies in the frequency domain. This permits the determination of the amount of chromatic dispersion present in the signal.

By virtue of the present invention, the missing or reduced spectral (or frequency) components can be readily identified and, ultimately re-introduced into the optical signal thereby compensating for chromatic dispersion in a dynamic manner. To this end, the power of each spectral component in an ideal signal, e.g., that shown in FIG. 4 may be determined. By splitting the signal into spectral components using the detector of the exemplary embodiment of FIG. 3, the output from the lowpass filters 307 will yield the power for each particular spectral component of the signal. This spectral component power level is compared to that of an ideal signal, having no chromatic dispersion. Through this comparison, the appropriate degree of correction for the chromatic dispersion may be carried out. This correction for the chromatic dispersion in the real-time detection and feedback control loop 200 of FIG. 2 may be accomplished by reintroducing the "missing" spectral components of the ideal signal. Again, in the embodiment shown of FIG. 2 this may be accomplished by transforming the signals from A/D converters (308 of FIG. 3) into error voltages, which may be used to control a dispersion compensator 202, such as a Fiber Bragg Grating (FBG).

In the illustrative embodiment of FIG. 2, as briefly mentioned above, the dispersion compensator 202 according to the embodiment of FIG. 2, when used in conjunction with the detector in a feedback control loop, may provide "real-time" correction for chromatic dispersion. Thus, in the exemplary embodiment of FIGS. 2 and 3, the dispersion compensator accounts, in "real-time", for chromatic dispersion. This chromatic dispersion may result from dynamic changes in the optical network, e.g., temperature fluctuations in the network. It is of interest to note, however, that the above described chromatic dispersion compensation technique may usefully include a static chromatic dispersion compensation device, e.g., a dispersion compensation module, which is a static compensation technique, as discussed more fully above.

Finally, the invention of the present disclosure is particularly useful to effect "real-time" corrections for chromatic dispersion in higher frequency data rate applications. For example, if the data rate of the optical signal is on the order of 10 GBit/sec, the square wave signals have a period on the order of 100 picoseconds. At this data rate, temperature fluctuations in the optical system may introduce on the order of 50 picoseconds of chromatic dispersion. This level of chromatic dispersion is clearly unacceptable and would result in exceedingly high bit-error rates. The invention of the present disclosure enables the correction for chromatic dispersion at data rates even greater than 10 Gbit/sec through the "real-time" feedback control incorporating the detector of the illustrative of FIG. 3. According to the exemplary embodiment shown in FIG. 3, the detector exhibits its accuracy on the order of ±1% over a particular operating range, in real-time.

The invention having been described in detail, it will be readily apparent to one having ordinary skill in the art that the invention may be varied in a variety of ways. Such variations are not to be regarded as a departure from the scope of the invention. All such modifications, as would be apparent to one of ordinary skill in the art having had the benefit of the present disclosure, are intended to be included within the scope of the appended claims.

We claim:

1. An optical device for detecting chromatic dispersion, comprising:
   a receiver which converts an optical signal into an electrical signal, said electrical signal having a plurality of frequency components;
   a bandpass section which seperates said plurality of frequency components, wherein each of said frequency components has a corresponding voltage level; and a gain section which amplifies each of said corresponding voltage levels of said plurality of frequency components, wherein the device outputs a measure of chromatic dispersion in said optical signal based on a comparison of a power level of each of said frequency components to that of an ideal optical signal with no chromatic dispersion.

2. An optical device as recited in claim 1, wherein said receiver includes an optoelectronic device.

3. An optical device as recited in claim 2, wherein said optoelectronic device is a PIN detector.

4. An optical device as recited in claim 1, wherein said bandpass section includes a plurality of bandpass filters.

5. An optical device as recited in claim 4, wherein each of said plurality of bandpass filters transmit a portion of a spectrum of said electrical signal.

6. An optical device as recited in claim 1, wherein said gain section includes a plurality of square-law detectors.

7. An optical device as recited in claim 1, wherein said frequency components are in the range of approximately D.C. to approximately 10 GHz.

8. An apparatus for compensating for chromatic dispersion in an optical signal, comprising:
  a detector which converts at least a portion of the optical signal into an electrical signal having a plurality of frequency components; a controller which receives an output from said detector, wherein said detector outputs a measure of the chromatic dispersion present in said optical signal based on a comparison of a power level of each of said frequency components to that of an ideal optical signal with no chromatic dispersion; and
  a dispersion compensator which introduces corrective chromatic dispersion based on commands from said controller.

9. An apparatus as recited in claim 8, wherein a gain section amplifies each of said plurality of frequency components.

10. An apparatus as recited in claim 8, wherein said dispersion compensator includes a chirped Fiber Bragg Grating (FBG).

11. An apparatus as recited in claim 8, wherein said detector includes a digital signal processor (DSP) and said DSP outputs error voltages to said controller, which controls said dispersion compensator based on said comparison.

12. An apparatus as recited in claim 8, wherein said output from said detector includes a plurality of voltages and each of said plurality of voltages corresponds to a frequency component of said electrical signal.

13. A method for compensating for chromatic dispersion in an optical signal, the method comprising:
  converting at least a portion of the optical signal into an electrical signal having a plurality of frequency components;
  comparing each of said frequency components of said electrical signal with those of an ideal optical signal having no chromatic dispersion; and
  introducing corrective chromatic dispersion into the optical signal based on said comparing, so that chromatic dispersion is zero in said optical signal.

14. A method as recited in claim 13, wherein said introducing corrective chromatic dispersion into the optical signal further comprises:
  providing a dispersion compensator which introduces reduced or missing frequency components based on said comparing.

15. A method as recited in claim 14, wherein said dispersion compensator is a fiber Bragg grating (FBG).

* * * * *